(12) United States Patent
Hirsius

(10) Patent No.: US 11,253,733 B2
(45) Date of Patent: Feb. 22, 2022

(54) VEHICLE WINDOW GLASS SHEAR SYSTEM AND METHOD

(71) Applicant: John Hirsius, Metairie, LA (US)

(72) Inventor: John Hirsius, Metairie, LA (US)

( * ) Notice: Subject to any disclaimer, the term of this patent is extended or adjusted under 35 U.S.C. 154(b) by 99 days.

(21) Appl. No.: 16/869,967

(22) Filed: May 8, 2020

(65) Prior Publication Data

US 2021/0346727 A1 Nov. 11, 2021

(51) Int. Cl.
   *B26F 3/00* (2006.01)
   *A62B 3/00* (2006.01)
   *B60J 1/20* (2006.01)

(52) U.S. Cl.
   CPC ................. *A62B 3/005* (2013.01); *B60J 1/20* (2013.01)

(58) Field of Classification Search
   CPC ........... A62B 3/005; B60J 1/20; B60J 5/0493; Y10T 225/371; Y10T 225/30; Y10T 83/8782
   USPC .................................................. 225/1, 2, 94
   See application file for complete search history.

(56) References Cited

U.S. PATENT DOCUMENTS

| | | |
|---|---|---|
| 3,160,338 A | 12/1964 | Widman et al. |
| 3,243,222 A | 3/1966 | Loughary et al. |
| 4,550,621 A | 11/1985 | Rush |
| 4,974,365 A | 12/1990 | Ono |
| 7,988,078 B1 | 8/2011 | Roy et al. |
| 8,419,062 B2 | 4/2013 | Landini et al. |
| 8,505,348 B2 | 8/2013 | Colasse |
| 8,869,927 B2 * | 10/2014 | Oosterhuis .......... B60R 21/0136 180/271 |
| 9,364,693 B2 | 6/2016 | Kim |
| 2003/0089755 A1 | 5/2003 | Peers-Smith et al. |
| 2004/0050607 A1 * | 3/2004 | Souther .................. A62B 3/005 180/271 |
| 2005/0082331 A1 | 4/2005 | Yang |
| 2010/0301088 A1 * | 12/2010 | Purdy .................... A62B 3/005 225/103 |

FOREIGN PATENT DOCUMENTS

| | | |
|---|---|---|
| KR | 2018/0045219 | 5/2018 |
| WO | WO 2018/96204 A1 | 5/2018 |

* cited by examiner

*Primary Examiner* — Joseph J Hail
*Assistant Examiner* — Shantese L McDonald
(74) *Attorney, Agent, or Firm* — Keaty Law Firm LLC

(57) ABSTRACT

A vehicle window glass shear system and method for causing shearing breakage of vehicle window glass under emergency conditions by a concealed and easily operated system, having a concealed handle unit having a handle, a handle-unit bracket, and a handle-unit cable brace, having a concealed shear unit mounted on the bottom edge of the vehicle window with a shear-unit bracket, window-clamping plate, and fasteners, a shear bolt with a piercing point, a shear drive wheel, and a shear-unit cable brace, and having a cable within a cable sleeve transferring the activation force from the handle unit to the shear unit, driving the shear bolt toward the vehicle window and driving the piercing point into the vehicle window causing shearing breakage of the window glass.

20 Claims, 10 Drawing Sheets

VEHICLE WINDOW GLASS SHEAR SYSTEM AND METHOD

BACKGROUND OF THE INVENTION

This invention provides a vehicle window glass shear system and method for causing shearing breakage of vehicle window glass under emergency conditions by a concealed and easily operated system.

The windows and windshields or windscreens of vehicles provide a necessary means of seeing from inside to the outside of the vehicle while maintaining the ability to seal the vehicle. But in certain emergency situations, the windows and windshields create a trap for the occupants of the vehicle. Such trapping of individuals inside vehicles during accidents is one of the major causes of fatalities. The doors of a vehicle can be damaged such as to prevent opening and escape. If a vehicle becomes submerged in water, the pressure on the doors and windows can prevent opening and escape. In such cases, it is desirable to be able to break a window to allow escape either through the window or through the door after the equalization of pressure through a broken or breached window.

The need to extricate oneself from a vehicle in such emergency circumstances is seen especially in law-enforcement and military vehicles. Such vehicles might be equipped with tougher glass which might be especially hard to break.

The windows and windshields or windscreens of vehicles are made of glass which has been made stronger and made to break in such a way as to prevent sharp and jagged edges which could cause injury. Front and back windshields are normally made of laminated glass having a transparent plastic interlayer between two layers of glass which is formulated to fragment into small unsharp pieces. The plastic interlayer holds the glass together even when broken. Bulletproof glass is a type of laminated glass providing one or more interlayers which are thicker and even more resistant to penetration. Side windows are normally made of tempered glass or safety glass having no plastic interlayer but having a combination of soft and hard glasses which normally function as a solid pane of glass but, when subjected to sufficient shearing force, fragment into small unsharp pieces.

The need to break a window arises in emergency circumstances where finding and manipulating a portable and therefore misplace-able tool can be difficult. What is needed is a fixedly mounted system which is easy and intuitive to use, and which provides sure shearing and breakage of the window glass.

Korean Patent Application Publication No. 2018/0045219 for a "Glass Destructor," published on Sep. 14, 2018, discloses a glass breaking device. Glass breaking device according to one embodiment is a housing fixed to the window frame of the building glass window; a breaking rod screwably coupled to the housing to press and damage an edge of the window through a tip; a rotary knob for rotating the breaking rod; and a rotation limiter limiting a rotation operation of the rotation knob to allow or block rotation of the rotation knob.

U.S. Pat. No. 8,419,062 for a "Device for Breaking Rear Window of a Vehicle," issued on Apr. 16, 2013 to assignee Maserati S.p.A., provides for a device including an actuation system, normally housed in a sleeping or rest position within a space which is inner with respect to a vehicle rear window, and that can be actuated, following a collision or accident involving the vehicle, a closure element for the space housing the actuation system, provided between the latter and the rear window. The closure element has a pin for breaking the rear window. The actuation system, after its activation, strikes the closure element, making it move, along with the at least one pin, toward said rear window. The actuation system and the closure element travel with the same speed until the end of the stroke of the actuation system, the stroke ending before the actuation system contacts the rear window, the closure element, along with the at least one pin, further prosecuting its stroke until striking the rear window, breaking the rear window.

U.S. Pat. No. 8,869,927 for a "Safety System with Window Breaker for a Vehicle, Vehicle Provided Therewith and Method Therefor," issued on Oct. 28, 2014 to assignee A. S. Oosterhuis Beheer B. V. et al., provides for a safety system for a vehicle, a vehicle provided therewith, and a method for breaking a window. The safety system comprises a window breaker comprising a drive system and a pin driven by the drive system for breaking a window. A water sensor is operatively connected to the drive system for control thereof.

U.S. Pat. No. 7,988,078 for a "Glass-Breaker Mechanism," issued on Aug. 2, 2011 to inventors Julien Edwin Roy et al., provides for a glass-breaker mechanism including a sensor component and a glass-breaker component. The sensor component is installed at a low point within the driver door of a vehicle. The sensor component contains a water-soluble material that retains a spring in its compressed state so long as the water-soluble material is dry. If the vehicle is immersed in water, the water-soluble material dissolves, releasing the spring. The spring drives a pin into the end of a pressurized gas (e.g., $CO_2$) cartridge, releasing the gas therein. The gas passes through a tube to the glass-breaker component installed upon the glass just below the top of the door to drive a spiked piston into the glass and shatter the tempered safety glass of the window.

U.S. Pat. No. 9,364,693 for a "Glass Breaking Tool," issued on Jun. 14, 2016 to inventor Jung Sik Kim, provides for a glass breaking tool for breaking glass. The tool is mounted in a window, and may include an attachment plate for attaching the glass breaking tool to an interior wall adjacent to the glass and a sliding shaft cooperating with the attachment plate to rotate and extend and retract with respect to the attachment plate in order to break the glass. The sliding shaft may include a cutting edge to break the glass.

US Patent Application Publication No. 2003/0089755 for a "Device for Breaking Glass," published on May 15, 2003 by inventors Roy Peter Peers-Smith et al., discloses a glass window pane breaking device comprising a suction pad for attaching the device to the window, in use, a striker rod with a breaker tip, a trigger pawl engageable with the striker rod and a remotely operable trigger which is biased normally to prevent movement of the trigger pawl and thus to retain its engagement with the striker rod when this is held against the force of charged energy storage means urging the breaker tip in a direction to break the window pane, in use. A switch is also provided to "arm" the device or place it in a "safe" mode.

US Patent Application Publication No. 2005/0082331 for a "Tempered Glass Breaker," published on Apr. 21, 2005 by inventor Chi-Hong Yang, discloses a tempered glass breaker comprised of a main member, a spring, a drift pin, and a mounting base. The main member is positioned at the upper extent of the mounting base, the main member is sleeved into the spring, and the drift pin is situated at the lower extent. When a critical situation occurs, the application of external force enables the drift pin at the front extremity of the main member to directly impact a lateral corner of the tempered glass and cause the breakage of the glass to assist emergency escape. Moreover, the breaker structure of the present invention is simple, economical, and practical.

WIPO Patent Application Publication No. 2018/96204 for an "Emergency Window Breaking Apparatus," published on May 31, 2018 by assignee JuuEi Oy, discloses an apparatus for breaking a window in case of an emergency. The apparatus comprises a body, breaking means, and a handle, wherein the body is attachable to the window and the breaking means has a first end and a second end, and it is releasably attached to the handle at a second point between its second end and the middle. In the apparatus, the handle has a first end and a second end, and it is pivotally connected to the body at a hinge point between the first end and a middle of the handle between the first end and the second end, and comprises attachment means for releasably attaching the breaking means to the handle. Additionally, the position of the hinge point is arranged to cause the breaking means to detach from the handle when the handle is pulled more than a predetermined amount.

SUMMARY OF THE INVENTION

This invention provides a vehicle window glass shear system and method for causing shearing breakage of vehicle window glass under emergency conditions by a concealed and easily operated system.

The vehicle window glass shear system provides a concealed handle unit having a handle, a handle-unit bracket, and a handle-unit cable brace, provides a concealed shear unit mounted on the bottom edge of the vehicle window having a shear-unit bracket, window-clamping plate, and fasteners, a shear bolt with a piercing point, a shear drive wheel, and a shear-unit cable brace, and providing a cable within a cable sleeve transferring the activation force from the handle unit to the shear unit, driving the shear bolt toward the vehicle window and driving the piercing point into the vehicle window causing shearing breakage of the window glass.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
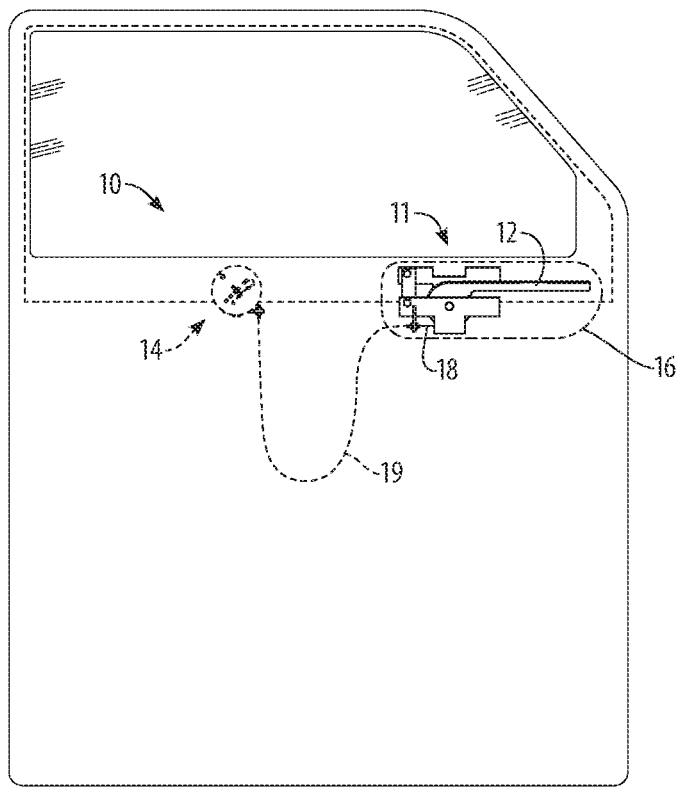
FIG. 1 is a schematic view of the vehicle window glass shear of the invention in use.

Referring to FIG. 1, the vehicle window glass shear 10 system and method provides a handle unit 11 for concealed mounting on a vehicle door frame behind a removable handle cover 16, and a shear unit 14 for concealed mounting on the bottom edge of a vehicle window inside the vehicle door frame.

Figure 2:
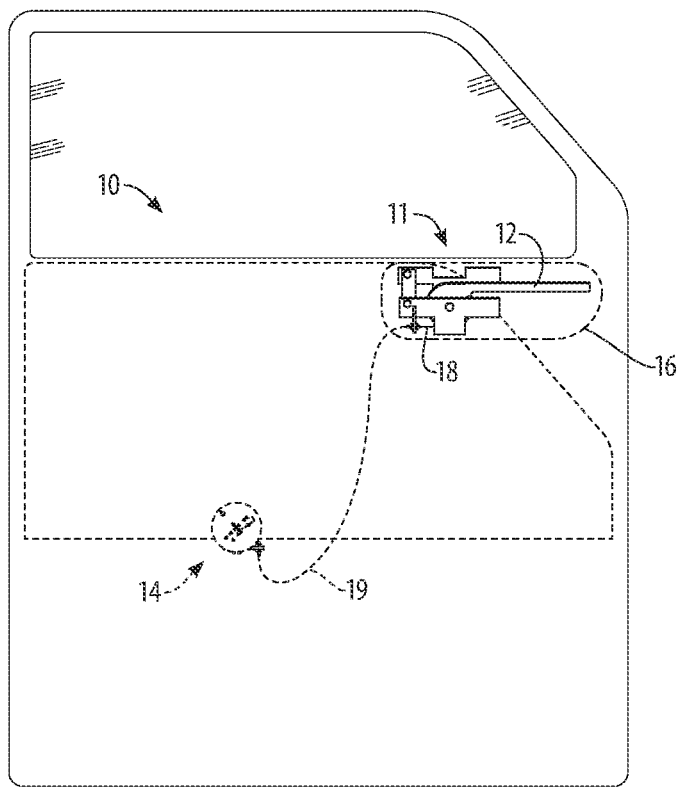
FIG. 2 is a schematic view of the vehicle window glass shear of the invention in use with the vehicle window down.

Referring to FIG. 2, the handle unit 11 and shear unit 14 are connected by a cable 18 within a cable sleeve 19 providing a flexible connection allowing the vehicle window to be moved up and down.

Figure 3:
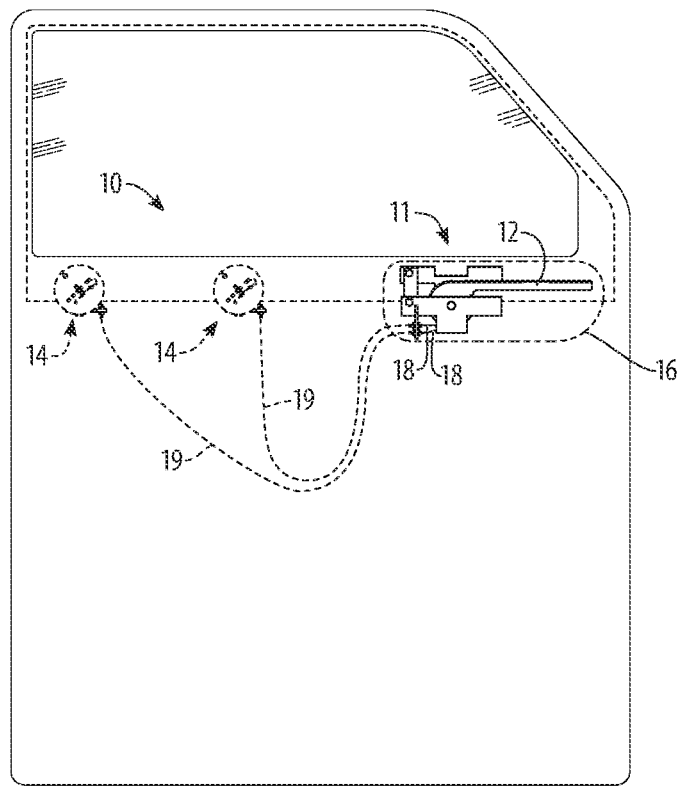
FIG. 3 is a schematic view of an embodiment of the vehicle window glass shear of the invention having more than one shear unit.

Referring additionally to FIG. 3, the invention provides embodiments having one shear unit 14 or more than one shear unit 14, such as might be needed for a very large window, for a bulletproofed, reinforced, or strengthened window, or in other circumstances.

Figure 4:
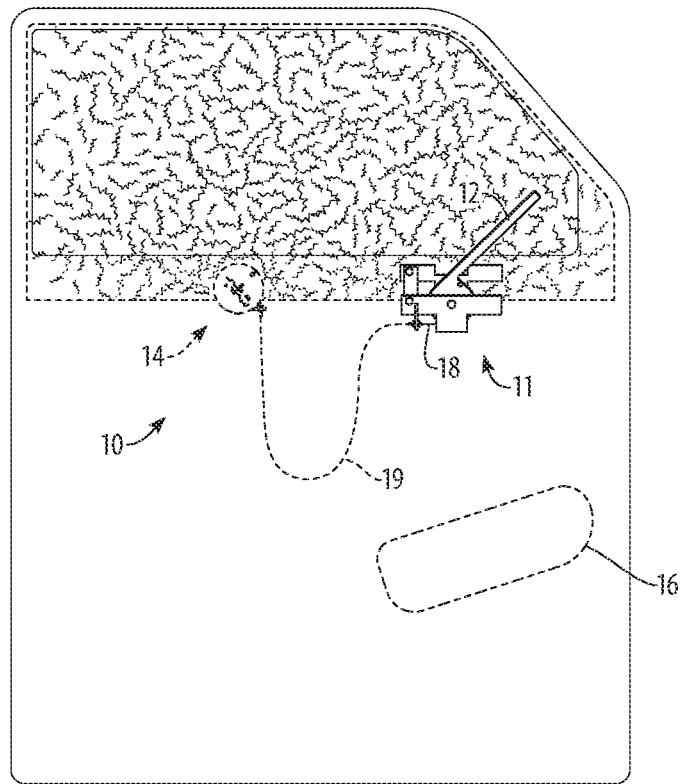
FIG. 4 is a schematic view of the vehicle window glass shear of the invention in use, activated.

Referring to FIG. 4, the vehicle window glass shear 10 is activated by removing the handle cover 16 and pulling the handle 12 of the handle unit 11, which pulls the cable 18 within the cable sleeve 19, activating the shear unit 14 as will be treated in detail below, and shearing the vehicle window allowing removal of the window.

Figure 5:
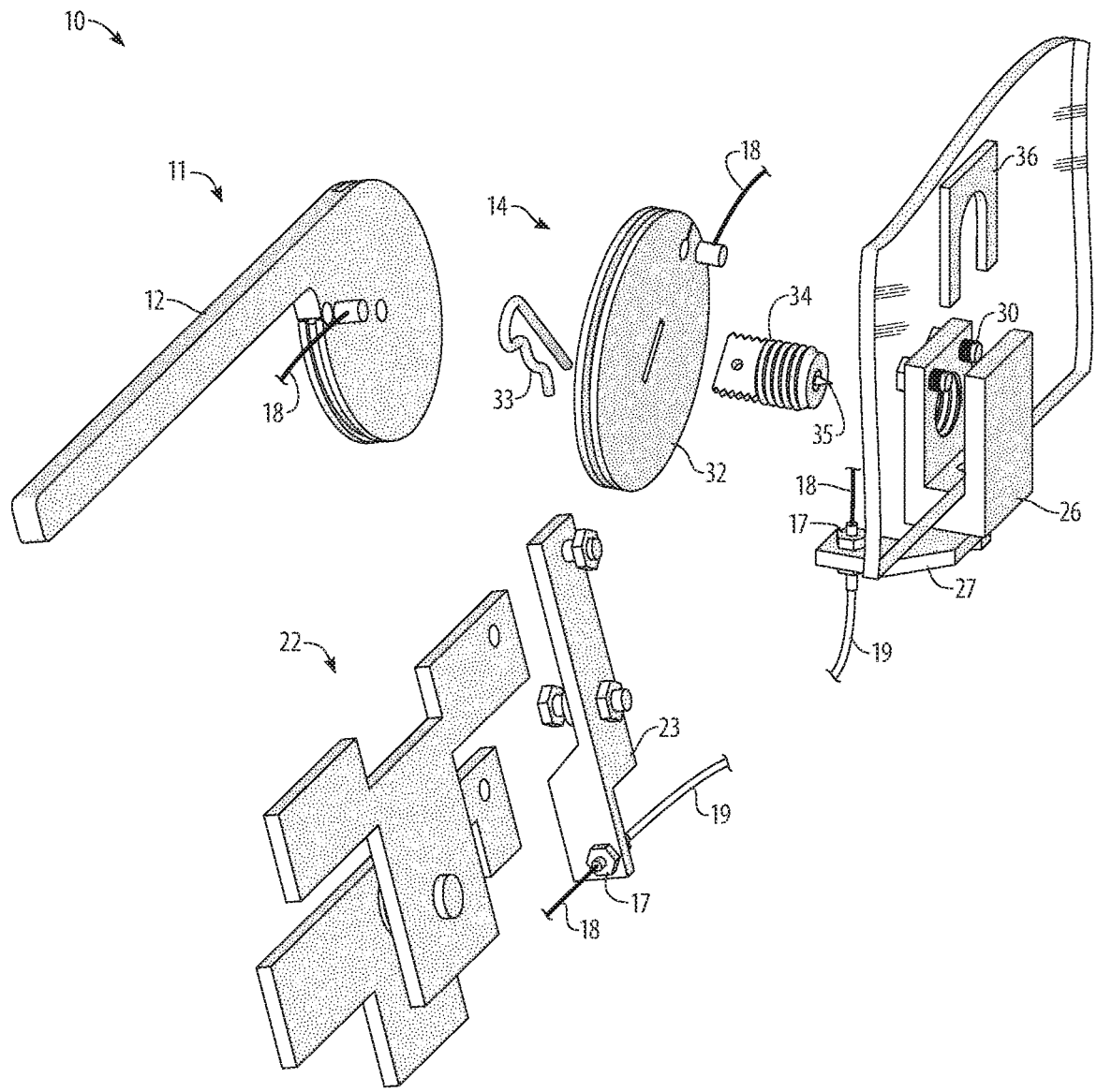
FIG. 5 is an exploded view of the vehicle window glass shear of the invention.

Referring to FIG. 5, the handle unit 11 provides a handle 12 rotatably mounted upon a handle-unit bracket 22 which in turn is mounted to the vehicle door frame. In a preferred embodiment, the handle 12 is mounted at an angle to the vertical such that in use the handle 12 is pulled upward and inward in relation to the vehicle door. The handle 12 provides a rounded surface, as shown, with a circumference of a sufficient size to cause the end of an attached cable 18 to travel a distance sufficient to operate the vehicle window glass shear 10 when the handle 12 is moved in an approximately one-quarter to one-third rotation. The design of the handle unit, and its intended method of use, makes rotation of more than one-half turn impractical or impossible. In an embodiment appropriate for a standard passenger vehicle with a standard window, the rounded portion of the handle 12 has a diameter of approximately 3 inches, and therefore a circumference of approximately 9.4 inches along which the end of the cable 18 is pulled approximately 3 inches with a one-third rotation of the handle 12. The 3-inch diameter size allows the handle unit 11 to be of a size that fits properly on a standard vehicle door frame.

A handle-unit cable brace 23 is mounted to the handle-unit bracket 22, and a cable-sleeve mount 17 is mounted to the handle-unit bracket 22. A first end of the cable sleeve 19 containing the cable 18 is mounted to the cable-sleeve mount 17, with the corresponding first end of the cable 18 extending through the cable-sleeve mount 17. The first end of the cable 18 is mounted to the handle 12 as shown. When the handle 12 is rotated, the first end of the cable 18 is pulled away from the first end of the cable sleeve 19, which is fixed in relation to the handle unit 11 by the cable-sleeve mount 17 mounted to the handle-unit bracket 22, thereby pulling the cable 18 within the cable sleeve 19.

The shear unit 14 provides a shear-unit bracket 26 for mounting upon the bottom edge of a vehicle window using a window-clamping plate 36 and fasteners 30 as shown. A shear-unit cable brace 27 having a cable-sleeve mount 17 is provided for mounting a second end of the cable sleeve 19 in a fixed position relative to the shear unit 14, with a second end of the cable 18 extending from the cable sleeve 19.

The shear unit further provides a shear bolt 34 having a piercing point 35, as shown. The shear bolt 34 has a threaded bolt portion for mounting into a corresponding threaded hole in the shear-unit bracket 26 such that rotation of the shear bolt 34 drives the shear bolt 34 further into the shear-unit bracket 26 and therefore closer to the portion of the vehicle window encompassed by the shear-unit bracket 26. The piercing point 35 is mounted upon the window-facing end of the shear bolt 34. In the embodiment shown, the piercing point 35 is potted into a recess in the shear bolt 34 using an epoxy resin or similar adhesive. The piercing point 35 is of a length and configuration sufficient to penetrate the window glass enough to initiate shearing. For more common tempered glass, the piercing point 35 should penetrate the window glass enough to initiate shearing. For less common laminated glass, the piercing point 35 should penetrate through the near layer of glass, the interlayer, and into the far layer of glass.

The shear bolt 34 is driven through the shear-unit bracket 26 and toward the vehicle window by a shear drive wheel 32 mounted to the shear bolt 34 such that rotation of the shear drive wheel 32 transfers rotational force to the shear bolt 34. The shear drive wheel 32 has a rotation-driving structure and the shear bolt has a corresponding rotation-driven structure. In the embodiment shown, the shear drive wheel 32 is provided with a slot as the rotation-driving structure, the shear bolt 34 is provided with a corresponding tab portion as the rotation-driven structure, and the two are fixed together with a shear bolt retainer 33 as shown.

A second end of the cable 18 is mounted to the shear drive wheel 32 as shown. When the first end of the cable 18 is pulled by operation of the handle 12, the second end of the cable 18 pulls the shear drive wheel 32, imparting a rotational force which is transferred to the shear bolt 34, thereby driving the shear bolt 34 toward the vehicle window.

The choice of diameter and therefore circumference of the shear drive wheel 32 is subject to the same considerations as for the handle 12. In the embodiment shown, the shear drive wheel 32 is of approximately the same size as the pertinent part of the handle 12, and so the amount of rotation of the handle 12 is approximately duplicated in the shear drive wheel. If, for example, the shear drive wheel 32 were sized smaller than the handle 12, the shear drive wheel 32 would be rotated more than the rotation of the handle 12, and the shear bolt 34 could thereby be driven a greater distance if that were needed.

Figure 6:
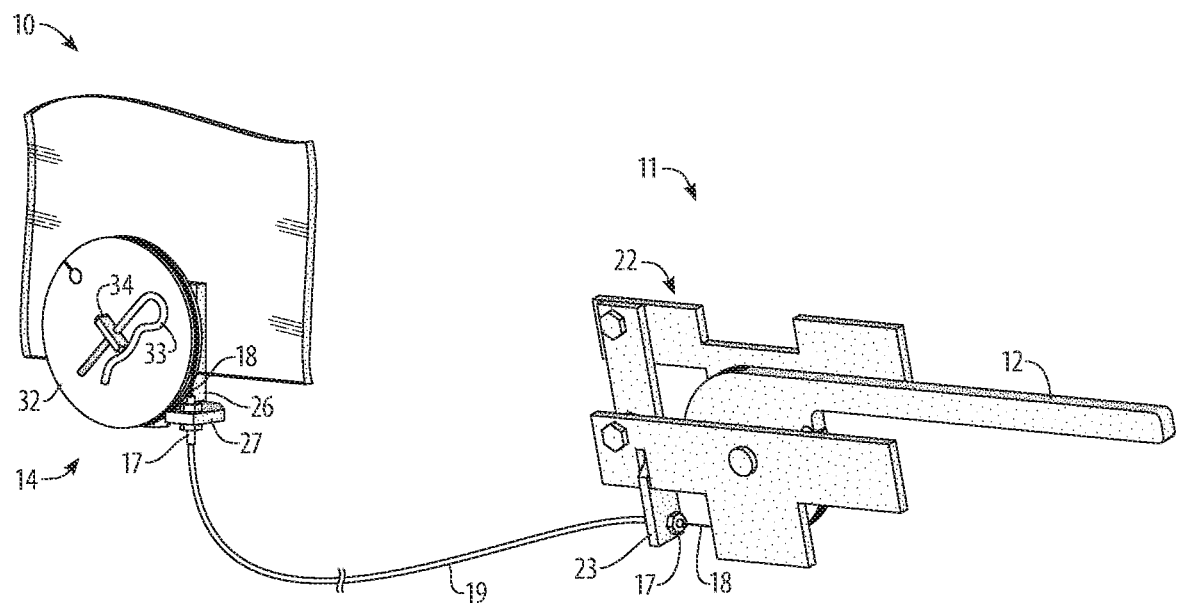
FIG. 6 is a perspective view of the vehicle window glass shear of the invention in use before activation.
Figure 8:
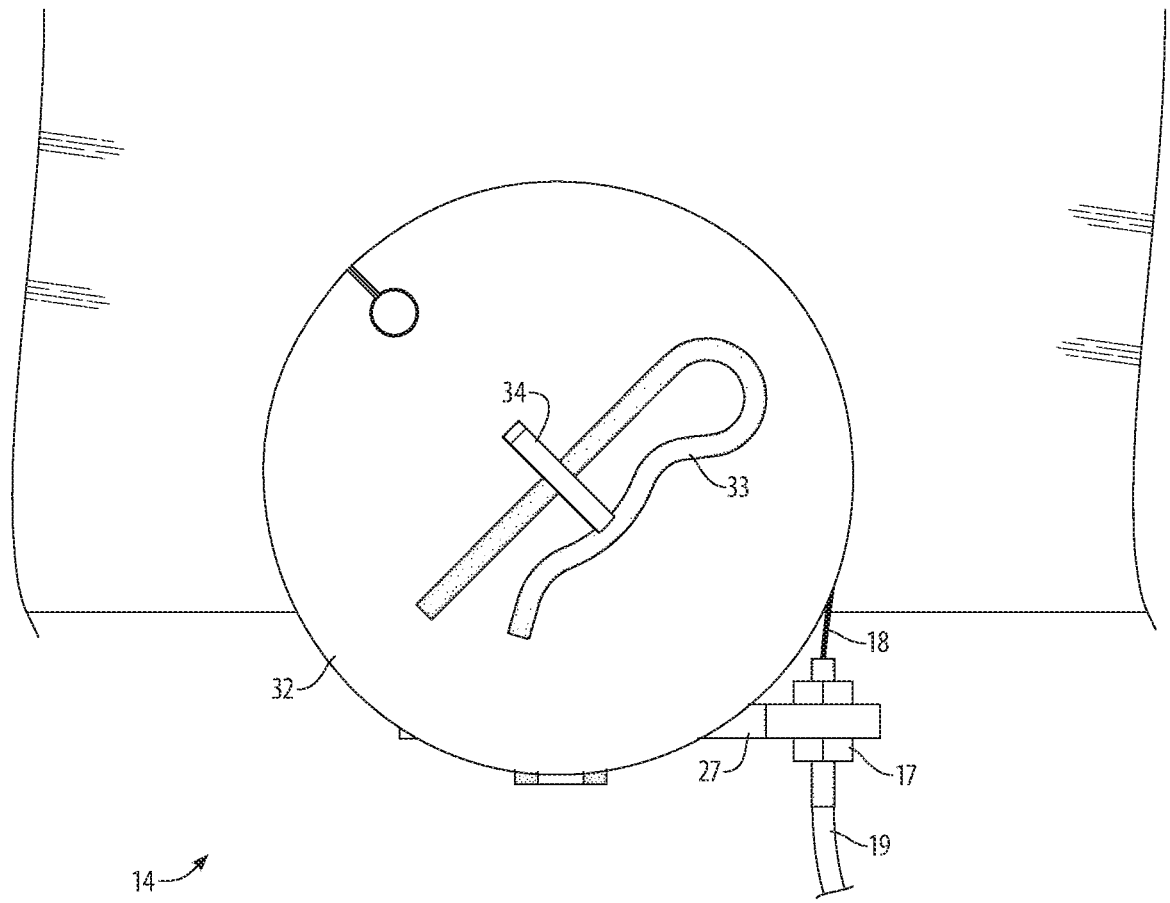
FIG. 8 is a front view of the shear unit of the vehicle window glass shear of the invention in use before activation.
Figure 10:
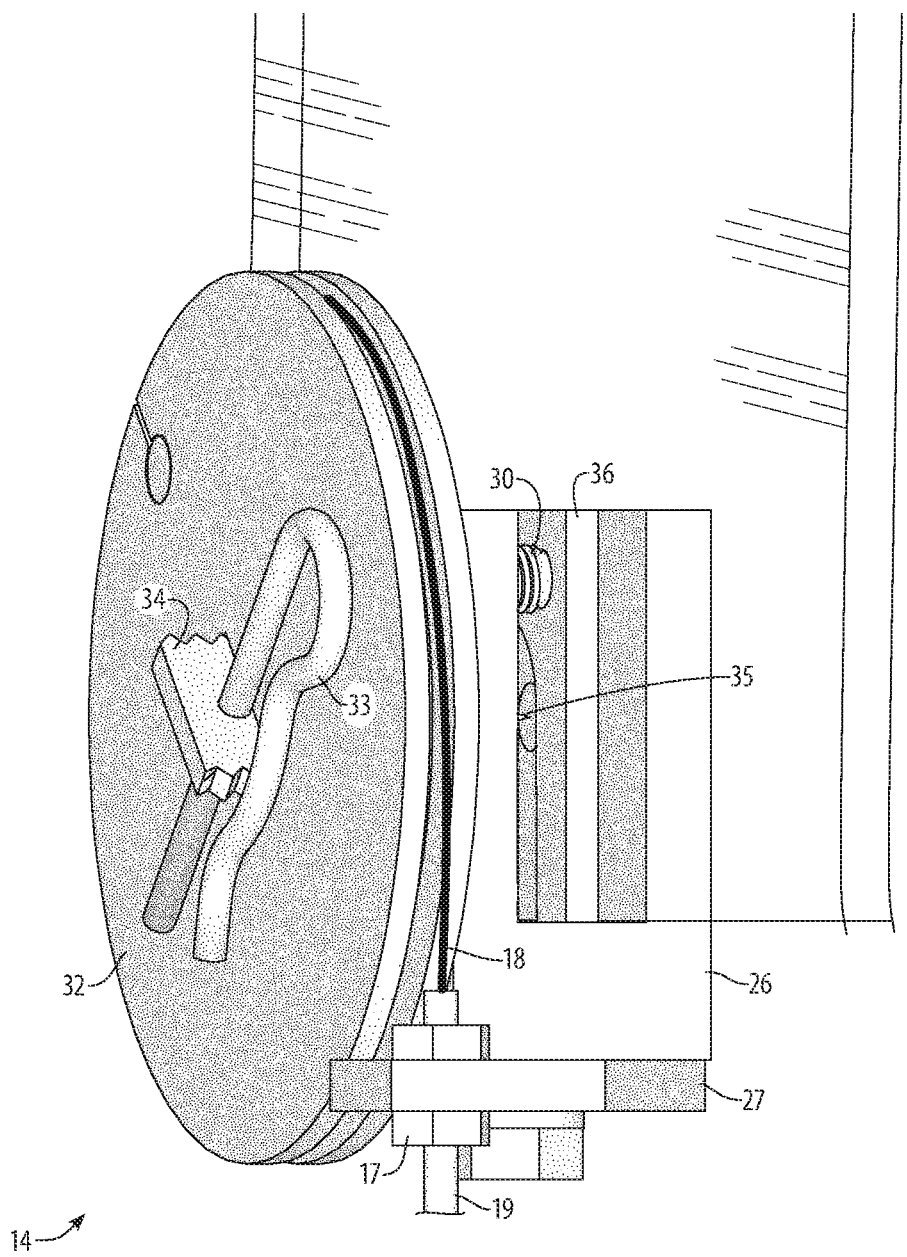
FIG. 10 is a perspective view of the shear unit of the vehicle window glass shear of the invention in use before activation.
Figure 11:
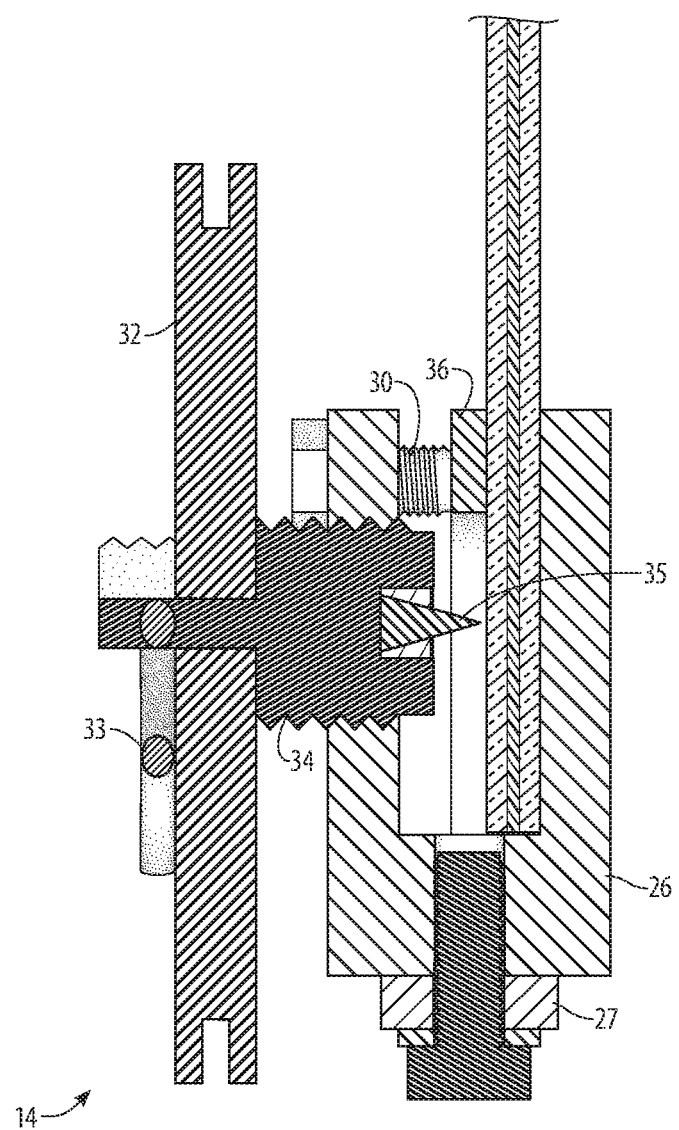
FIG. 11 is a cross-section view of the shear unit of the vehicle window glass shear of the invention in use before activation.

Referring to FIG. 6, in use, before activation, the handle 12 is positioned down and the shear unit 14 is mounted to the bottom edge of the vehicle window by the shear-unit bracket 26. Referring additionally to FIG. 8, the cable 18 wraps a portion of the way around the circumference of the shear drive wheel 32 such that a pull on the cable 18 will cause rotation of the shear drive wheel 32. Referring additionally to FIG. 10 and FIG. 11, the shear bolt 34 is located such that the piercing point 35 is not in contact with the vehicle window.

Figure 7:
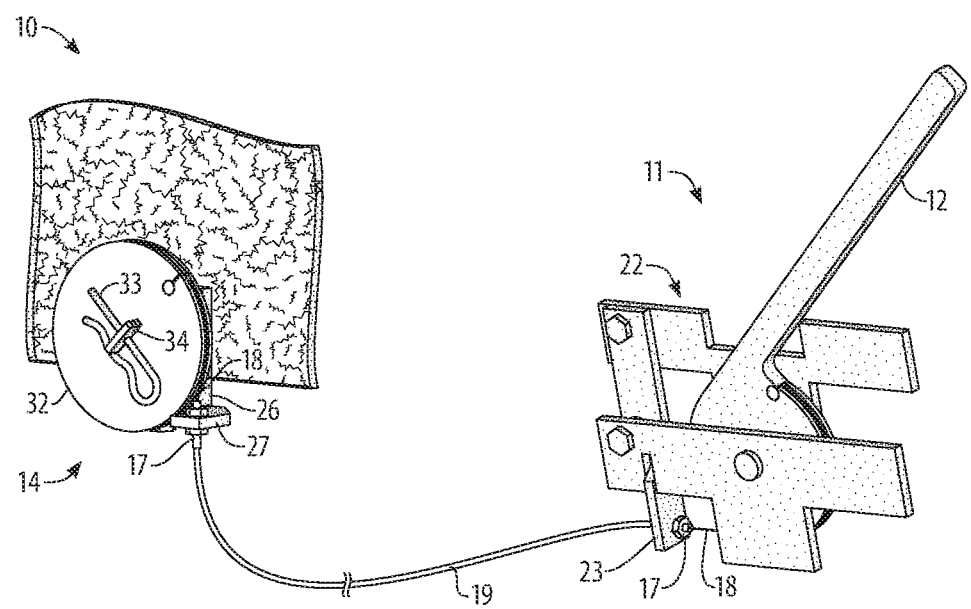
FIG. 7 is a perspective view of the vehicle window glass shear of the invention in use after activation.
Figure 9:
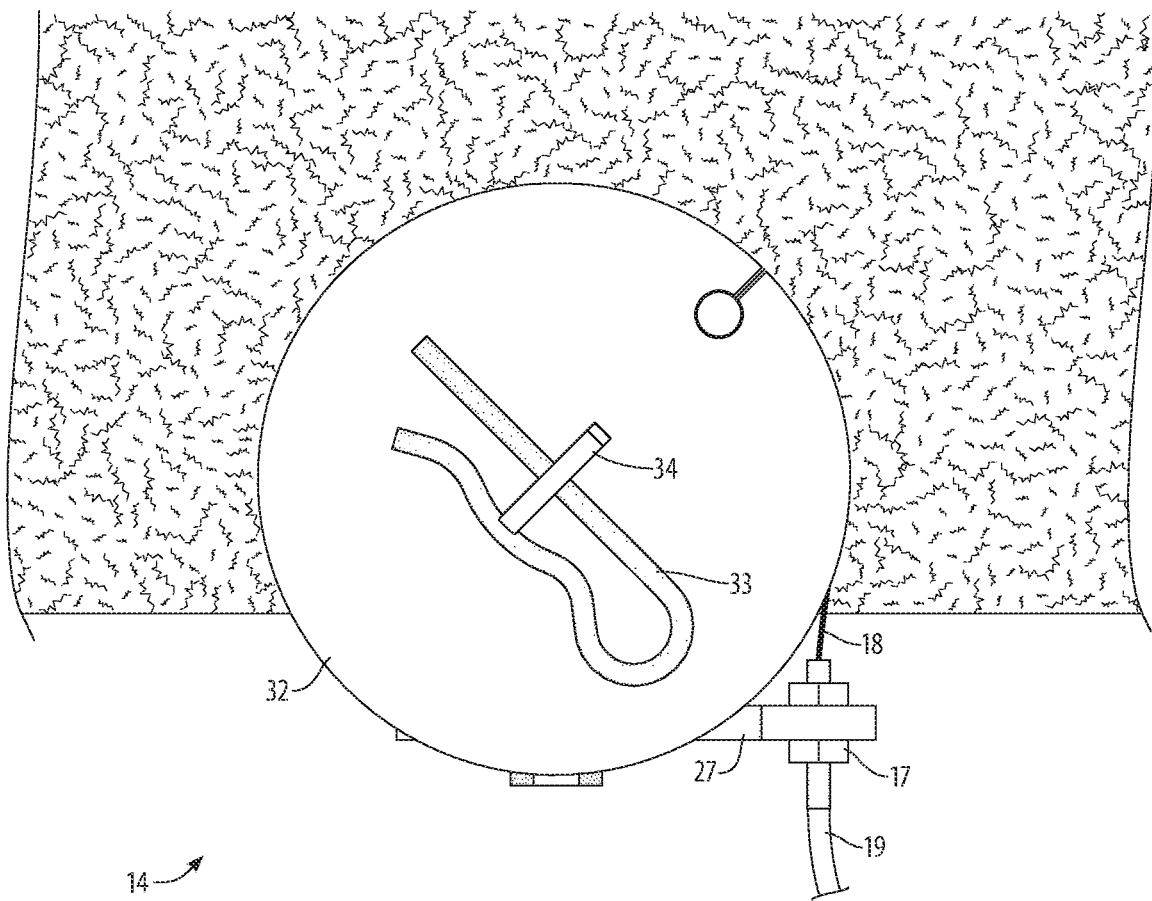
FIG. 9 is a front view of the shear unit of the vehicle window glass shear of the invention in use after activation.
Figure 12:
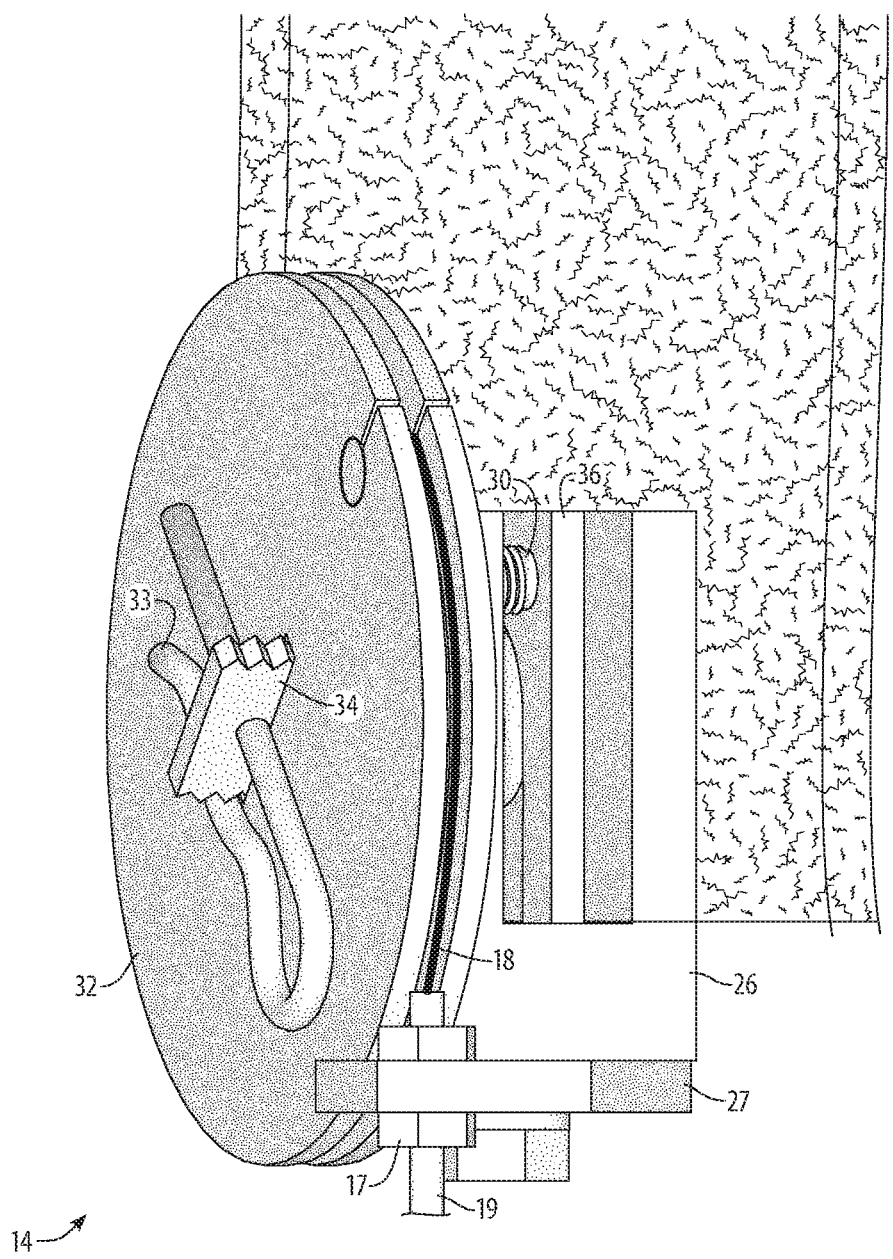
FIG. 12 is a perspective view of the shear unit of the vehicle window glass shear of the invention in use after activation.
Figure 13:
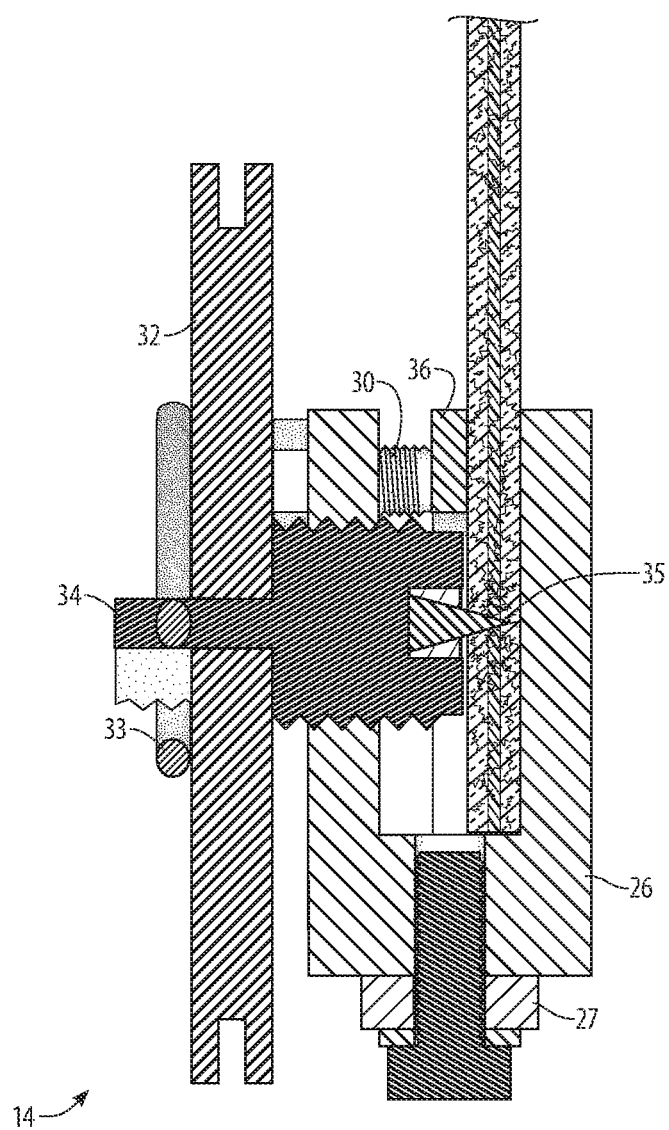
FIG. 13 is a cross-section view of the shear unit of the vehicle window glass shear of the invention in use after activation.

Referring to FIG. 7, in use, when activated, the handle 12 is pulled upward, imparting rotation which pulls on the first end of the cable 18. Referring additionally to FIG. 9, the second end of the cable 18 pulls the shear drive wheel 32 and the mounted shear bolt 34 into rotational motion. Referring additionally to FIG. 12 and FIG. 13, the rotated shear bolt 34 is driven towards the vehicle window glass such that the piercing point 35 is driven into the glass to a depth sufficient to cause shearing of the window glass. At this point, with tempered glass whatever glass fragments that have not already fallen away can be pushed out of the way, and with laminated glass the initial breech of the interlayer can be enlarged against reduced resistance because the glass layers will have been fragmented and will no longer reinforce the integrity of the interlayer.

Many other changes and modifications can be made in the system and method of the present invention without departing from the spirit thereof. I therefore pray that my rights to the present invention be limited only by the scope of the appended claims.

I claim:

1. A vehicle window glass shear system for causing shearing breakage of vehicle window glass, comprising:
   (i) a cable in a cable sleeve, each having a first end and a second end;
   (ii) a handle unit for concealed mounting on a vehicle door frame, further comprising:
      (a) a handle having a rounded surface adapted to attach to said first end of said cable and to pull said cable within said cable sleeve when activated by rotation;
      (b) a handle-unit bracket adapted to rotatably mount said handle on a vehicle door frame; and
      (c) a handle-unit cable brace mounted on said handle-unit bracket, having a cable-sleeve mount mounted thereon, adapted to provide a mounting point for said first end of said cable sleeve which is fixed in relation to said handle-unit bracket and through which said first end of said cable passes; and
   (iii) a shear unit for concealed mounting on a vehicle window having a bottom edge, further comprising:
      (a) a shear-unit bracket adapted for mounting on the bottom edge of the vehicle window using a window-clamping plate and fasteners, having a threaded hole;
      (b) a shear-unit cable brace mounted on said shear-unit bracket, having a cable-sleeve mount mounted thereon, adapted to provide a mounting point for said second end of said cable sleeve which is fixed in relation to said shear-unit bracket and through which said second end of said cable passes;
      (c) a shear bolt having a window-facing end, having a threaded bolt portion at said window-facing end corresponding to said threaded hole of said shear-unit bracket, adapted to move within said shear-unit bracket upon rotation, and having a rotation-driven structure opposite said window-facing end;
      (d) a piercing point mounted on said window-facing end of said shear bolt, adapted to penetrate the vehicle window upon activation, causing shearing breakage of the vehicle window;
      (e) a shear drive wheel adapted to attach to said second end of said cable and to be pulled by said cable within said cable sleeve into rotation when activated, having a rotation-driving structure corresponding to said rotation-driven structure of said shear bolt; and
      (f) a shear bolt retainer adapted to mount said shear bolt and said shear drive wheel together;
   where, in use, activation by pulling on said handle exerts a pull on said cable which in turn exerts a rotational force on said shear drive wheel, rotating and driving said shear bolt toward the vehicle window and driving said piercing point into the vehicle window, causing shearing breakage of the vehicle window glass.

2. The vehicle window glass shear system of claim 1, further comprising a removable handle cover for concealment.

3. The vehicle window glass shear system of claim 1, where said handle unit is mounted at a vertical angle on the vehicle door frame.

4. The vehicle window glass shear system of claim 1, where said rotation-driven structure of said shear bolt is a tab and said rotation-driving structure of said shear drive wheel is a slot.

5. The vehicle window glass shear system of claim 1, where said shear bolt retainer is a pin.

6. The vehicle window glass shear system of claim 1, where said rounded surface of said handle has a diameter of 3 inches.

7. The vehicle window glass shear system of claim 1, where said shear drive wheel has a diameter of 3 inches.

8. The vehicle window glass shear system of claim 1, where activation by rotation of said handle pulls said cable 3 inches.

9. The vehicle window glass shear system of claim 1, where said rounded surface of said handle and said shear drive wheel have the same diameters.

10. The vehicle window glass shear system of claim 1, where activation is achieved with rotation of said handle by an amount between one-quarter and one-half of a full turn, inclusive.

11. A vehicle window glass shear method of causing shearing breakage of vehicle window glass, comprising:
  (i) providing a vehicle window glass shear system comprising:
    (a) a cable in a cable sleeve, each having a first end and a second end;
    (b) a handle unit for concealed mounting on a vehicle door frame, further comprising:
      (1) a handle having a rounded surface adapted to attach to said first end of said cable and to pull said cable within said cable sleeve when activated by rotation;
      (2) a handle-unit bracket adapted to rotatably mount said handle on a vehicle door frame; and
      (3) a handle-unit cable brace mounted on said handle-unit bracket, having a cable-sleeve mount mounted thereon, adapted to provide a mounting point for said first end of said cable sleeve which is fixed in relation to said handle-unit bracket and through which said first end of said cable passes; and
    (c) a shear unit for concealed mounting on a vehicle window having a bottom edge, further comprising:
      (1) a shear-unit bracket adapted for mounting on the bottom edge of the vehicle window using a window-clamping plate and fasteners, having a threaded hole;
      (2) a shear-unit cable brace mounted on said shear-unit bracket, having a cable-sleeve mount mounted thereon, adapted to provide a mounting point for said second end of said cable sleeve which is fixed in relation to said shear-unit bracket and through which said second end of said cable passes;
      (3) a shear bolt having a window-facing end, having a threaded bolt portion at said window-facing end corresponding to said threaded hole of said shear-unit bracket, adapted to move within said shear-unit bracket upon rotation, and having a rotation-driven structure opposite said window-facing end;
      (4) a piercing point mounted on said window-facing end of said shear bolt, adapted to penetrate the vehicle window upon activation, causing shearing breakage of the vehicle window;
      (5) a shear drive wheel adapted to attach to said second end of said cable and to be pulled by said cable within said cable sleeve into rotation when activated, having a rotation-driving structure corresponding to said rotation-driven structure of said shear bolt; and
      (6) a shear bolt retainer adapted to mount said shear bolt and said shear drive wheel together; and
  (ii) activating said vehicle window glass shear system by pulling on said handle exerting a pull on said cable, in turn exerting a rotational force on said shear drive wheel, rotating and driving said shear bolt toward the vehicle window and driving said piercing point into the vehicle window, causing shearing breakage of the vehicle window glass.

12. The vehicle window glass shear method of claim 11, where said vehicle window glass shear system further comprises a removable handle cover for concealment.

13. The vehicle window glass shear method of claim 11, where said handle unit is mounted at a vertical angle on the vehicle door frame.

14. The vehicle window glass shear method of claim 11, where said rotation-driven structure of said shear bolt is a tab and said rotation-driving structure of said shear drive wheel is a slot.

15. The vehicle window glass shear method of claim 11, where said shear bolt retainer is a pin.

16. The vehicle window glass shear method of claim 11, where said rounded surface of said handle has a diameter of 3 inches.

17. The vehicle window glass shear method of claim 11, where said shear drive wheel has a diameter of 3 inches.

18. The vehicle window glass shear method of claim 11, where activation by rotation of said handle pulls said cable 3 inches.

19. The vehicle window glass shear method of claim 11, where said rounded surface of said handle and said shear drive wheel have the same diameters.

20. The vehicle window glass shear method of claim 11, where activation is achieved with rotation of said handle by an amount between one-quarter and one-half of a full turn, inclusive.

* * * * *